United States Patent [19]

Zegler

[11] Patent Number: 4,988,551

[45] Date of Patent: Jan. 29, 1991

[54] CARPET HAVING NONWOVEN FLEECE ADHERED TO SECONDARY BACKING BY EMBOSSING AND METHOD OF MAKING SAME

[75] Inventor: Stephen A. Zegler, Cohutta, Ga.

[73] Assignee: Collins & Aikman Floor Coverings Corporation, Dalton, Ga.

[21] Appl. No.: 416,013

[22] Filed: Oct. 2, 1989

[51] Int. Cl.$^5$ .................. B32B 7/06; B32B 31/20
[52] U.S. Cl. .................... 428/40; 156/184; 156/209; 156/289; 156/324; 428/95; 428/161; 428/906
[58] Field of Search ............... 156/72, 184, 209, 219, 156/220, 289, 324; 428/40, 95, 161, 906

[56] References Cited

U.S. PATENT DOCUMENTS

| | | | |
|---|---|---|---|
| 3,014,829 | 12/1961 | Curtin | 428/40 X |
| 3,394,043 | 7/1968 | Parlin et al. | 428/95 X |
| 3,402,094 | 9/1968 | Levitch | 428/40 |
| 3,847,647 | 11/1974 | Bahlo | 428/198 X |
| 4,010,302 | 3/1977 | Anderson et al. | 428/95 |
| 4,075,377 | 2/1978 | Aitchison et al. | 428/95 |
| 4,234,649 | 11/1980 | Ward | 428/255 |
| 4,278,482 | 7/1981 | Poteet et al. | 156/209 X |
| 4,405,668 | 9/1983 | Wald | 428/40 |
| 4,412,877 | 11/1983 | Vosburgh | 156/72 |
| 4,504,537 | 3/1985 | Mussallem, Jr. | 428/95 X |
| 4,557,774 | 12/1985 | Hoopengardner | 428/95 X |
| 4,617,210 | 10/1986 | Zybko | 428/40 X |
| 4,647,484 | 3/1987 | Higgins | 428/40 |
| 4,797,170 | 1/1989 | Hoopengardner | 428/40 X |
| 4,849,267 | 7/1989 | Ward et al. | 428/95 X |
| 4,865,688 | 9/1989 | Cross et al. | 156/209 X |

Primary Examiner—Robert A. Dawson
Attorney, Agent, or Firm—Bell, Seltzer, Park & Gibson

[57] ABSTRACT

A fibrous faced carpet includes a nonwoven fleece fabric positioned against the carpet secondary backing. The fleece fabric is embossed to form high and low areas with the low areas extending into the secondary backing and serving to unitize the fleece fabric with the secondary backing. A layer of pressure sensitive adhesive is on the exposed outer face of the fleece fabric for releasably securing the carpet to an underlying floor. The low areas of the embossed fleece fabric serve for reducing the exposed surface area of the layer of adhesive that is available to contact the underlying floor.

19 Claims, 2 Drawing Sheets

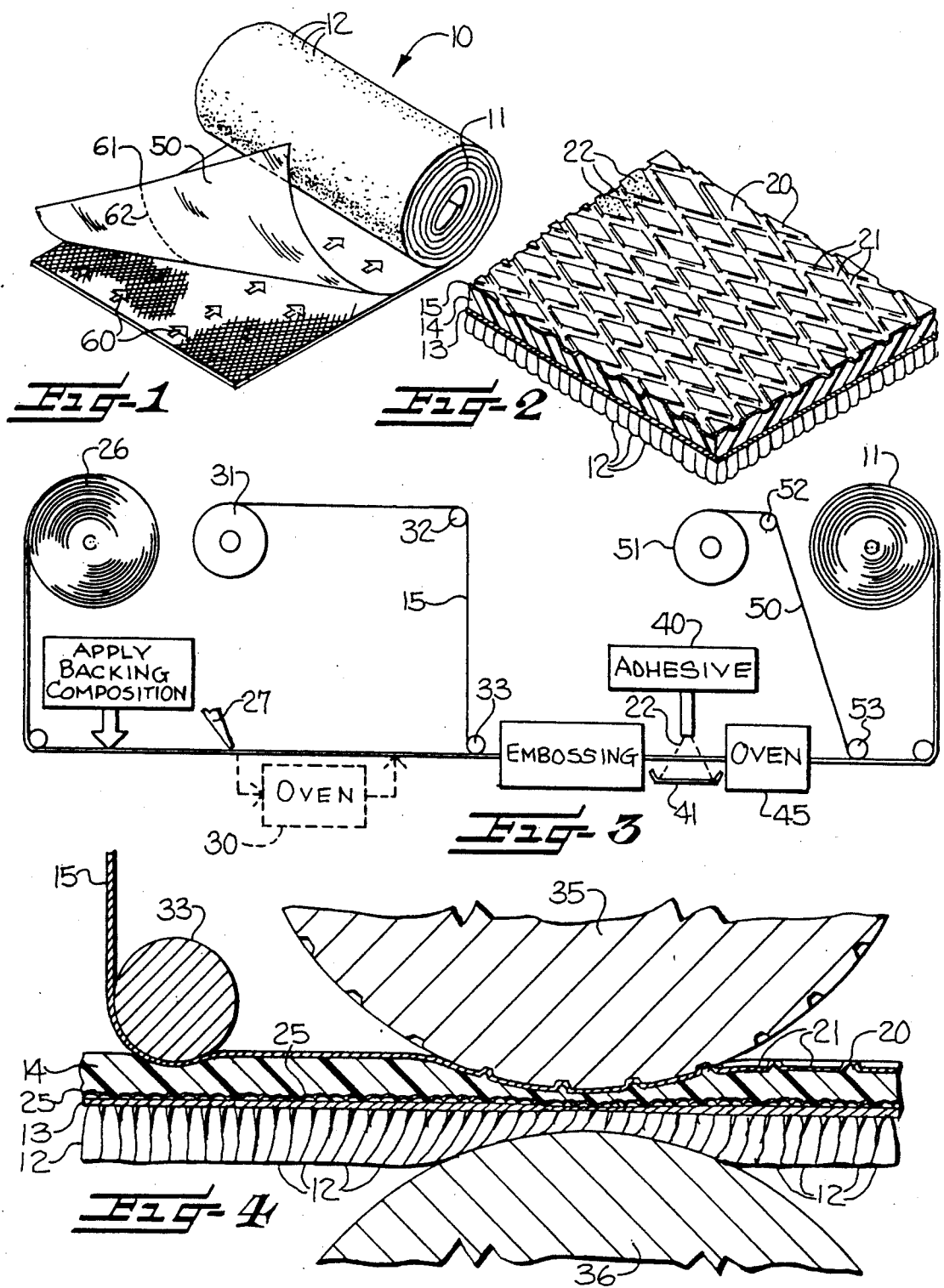

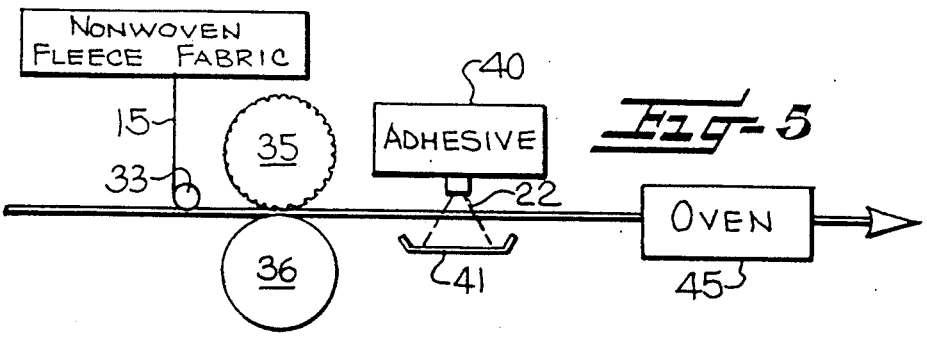
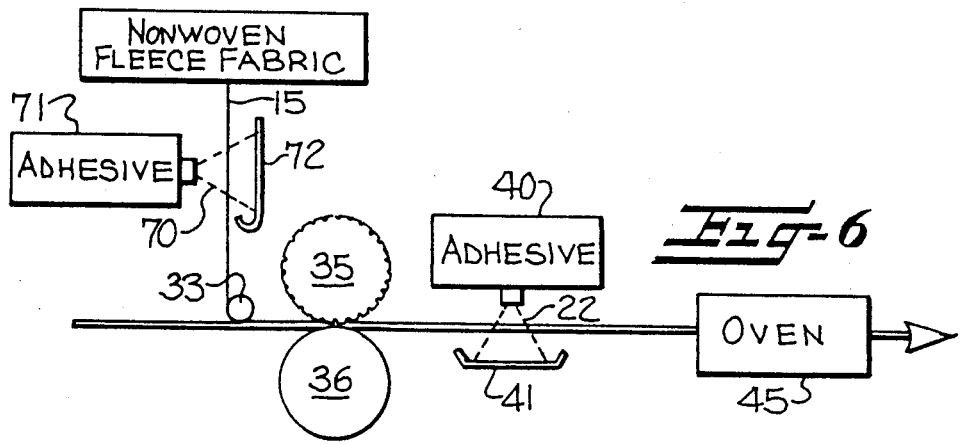
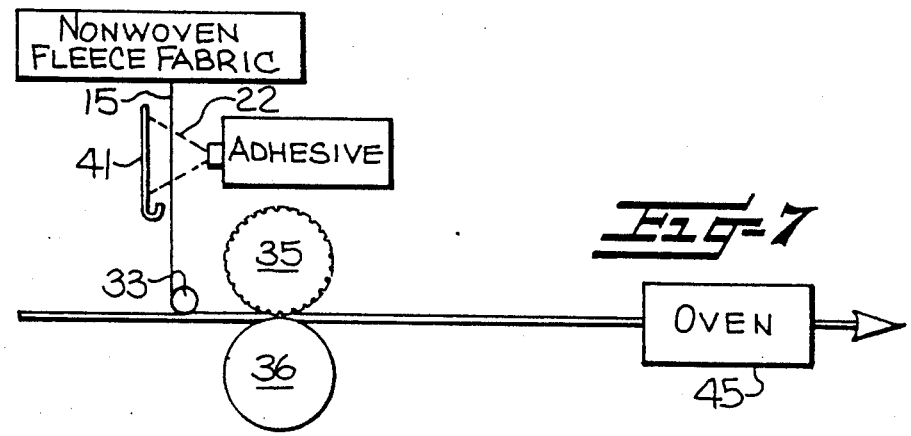
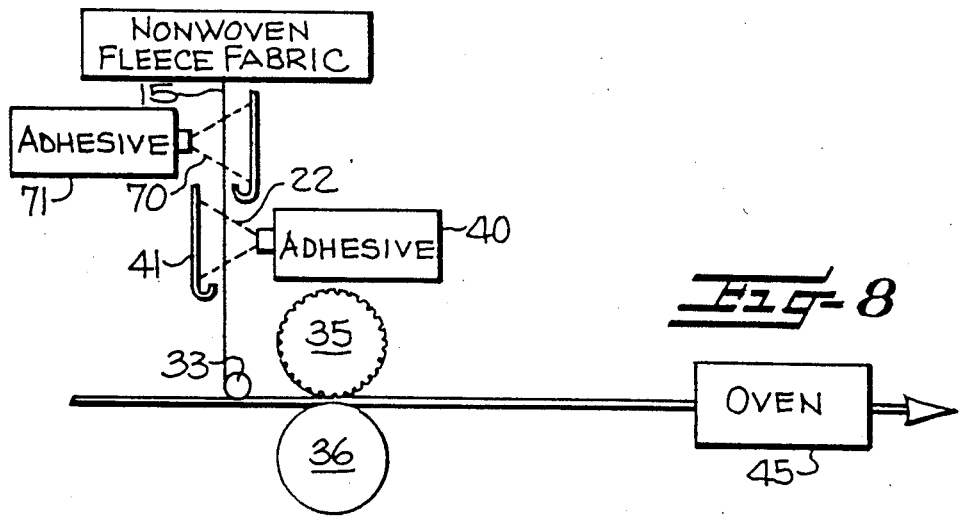

CARPET HAVING NONWOVEN FLEECE ADHERED TO SECONDARY BACKING BY EMBOSSING AND METHOD OF MAKING SAME

Field Of The Invention

A common floor covering used in commercial buildings and the like is a carpet having a primary backing and a secondary backing permanently adhered to the primary backing. Typically, an adhesive is first applied to the underlying building floor, and then the carpet applied thereon. The carpet is secured from shifting by means of the adhesive. Additionally, depending on the type of secondary backing, a reinforcer, such as a nonwoven fleece fabric, is applied to the secondary backing by means such as an adhesive. For example, urethane and other similar polymer backings commonly are used where a resilient cushion effect is desired of the installed carpet. However, some of these secondary backings, like urethane, are inherently weak and easily can tear or rip during handling, installation, and removal of the carpet. Therefore, it is desirable to apply the nonwoven fleece fabric to the urethane backing as well as other backings which tend to separate from the primary backing.

Recently, new developments have been made in this type of carpet with the use of pressure sensitive adhesives. For example, in the commonly assigned invention of recently granted U.S. Pat. No. 4,849,267, a carpet is disclosed as having a layer of pressure sensitive adhesive on the secondary backing for releasably securing the floor covering to an underlying floor. If the carpet needs to be removed for any reason, such as gaining access to various telephone or electrical trunk lines extending through an underlying floor, the adhesively secured carpet can be removed by peeling it upwardly away from the underlying floor. Other U.S. Patents also disclose the use of a pressure sensitive adhesive to aid in releasably securing a carpet to an underlying floor. Hoopengardner U.S. Pat. Nos. 4,797,170 and 4,557,774 disclose a cushion pad having a pressure sensitive adhesive thereon separately applied to an underlying floor. A carpet is applied onto the separate pad and secured thereon by the pressure sensitive adhesive. A scrim can be applied onto at least the lower surface of the pad to aid in maintaining dimensional stability and insuring releasable disengagement of the carpet from the underlying floor without ripping or tearing of the carpet or cushion pad. Wald U.S. Pat. No. 4,405,668 discloses a scrim coated with pressure sensitive adhesive applied onto a secondary backing. Ward U.S. Pat. No. 4,234,649 discloses a scrim coated with pressure sensitive adhesive and applied to a floor. A carpet is applied thereon and releasably secured by means of the pressure sensitive adhesive.

These prior art patents all disclose a carpet construction which is releasably secured to the underlying floor by means of a pressure sensitive adhesive. However, it has been determined that the application of a pressure sensitive adhesive to a nonwoven fleece backing such as conventionally used with urethane and other polymer secondary backings is not practical. The inherent weakness of the backing causes either the fleece fabric to separate and remain on the floor when the carpet is removed therefrom or to tear therefrom.

However, is desirable to manufacture a carpet where a pressure sensitive adhesive can be applied onto the fleece fabric so that the carpet later can be removed from an underlying floor as a unitized piece. It has been determined that through the use of embossing techniques applied to the fleece fabric backing, the amount of pressure sensitive adhesive which contacts an underlying floor can be controlled by reducing the effective exposed surface area of the layer of adhesive that is available to contact the underlying floor and assuring that the fleece fabric later can be removed with the carpet. Additionally, an embossed surface can strengthen the bond between the fleece fabric and secondary backing to lessen the chance that the fleece fabric will separate from the secondary backing upon removal from an underlying floor.

With the foregoing in mind, it is therefore an object of this invention to provide a carpet having a nonwoven fleece fabric positioned against the secondary backing and being embossed so as to form high and low areas and a layer of pressure sensitive adhesive thereon and with the low areas in the embossed fleece fabric serving for reducing the exposed surface area of the layer of adhesive that is available to contact the underlying floor when laying of the floor covering thereon.

It is still another object of this invention to provide a carpet having a nonwoven fleece fabric positioned against the secondary backing and being embossed so as to form high and low areas with the low areas extending into the secondary backing and serving to unitize the fleece fabric with the secondary backing, and a layer of pressure sensitive adhesive on the exposed outer face of the fleece fabric for releasably securing the floor covering to an underlying floor and with the low areas in the embossed fleece fabric serving for reducing the exposed surface area of the layer of adhesive that is available to contact the underlying floor.

SUMMARY OF THE INVENTION

These and other objects and advantages of the present invention are accomplished by a carpet having textile fibers which define a fibrous upper outer face and a primary backing to which the textile fibers are secured. A secondary backing is permanently adhered to the lower surface of the primary backing. A nonwoven fleece fabric is positioned against the secondary backing and is embossed so as to form high and low areas with the low areas extending into the secondary backing and which serve to unitize the fleece fabric with the secondary backing.

A layer of pressure sensitive adhesive is present on the exposed outer face of the fleece fabric for releasably securing the carpet to an underlying floor. A release cover is releasably secured to the layer of pressure sensitive adhesive to protect and maintain the tackiness of the adhesive layer before laying of the carpet on an underlying floor. The low areas in the embossed fleece fabric serve for reducing the exposed surface area of the layer of adhesive that is available to contact the underlying floor when laying of the floor covering thereon.

BRIEF DESCRIPTION OF THE DRAWINGS

Some of the objects and advantages of the invention having been stated, other objects will appear as the description proceeds when taken in conjunction with the accompanying drawings in which:

FIG. 1 is an isometric view of a convolutely wound roll of floor covering in accordance with the present invention showing a portion of the release cover peeled therefrom.

FIG. 2 is an inverted isometric sectional view of the floor covering in accordance with the present invention.

FIG. 3 is a diagrammatic view of the process in the manufacturing of the floor covering in accordance with the present invention showing successive steps in the application of the backing composition and the nonwoven fleece fabric, embossing of the fleece fabric, and the application of the pressure sensitive adhesive and the release cover.

FIG. 4 is an enlarged sectional view of the embossing step illustrated in block format in FIG. 3, and showing the embossing of the fleece fabric so as to form high and low areas.

FIG. 5 is a diagrammatic view of the manufacturing of the floor covering in accordance with a first preferred embodiment where a layer of pressure sensitive adhesive is sprayed onto the fleece fabric after the step of embossing.

FIG. 6 is a diagrammatic view in the manufacturing of the floor covering in accordance with a second embodiment where a layer of permanent adhesive is sprayed onto the nonwoven fleece fabric for engagement with the secondary backing and the pressure sensitive adhesive is sprayed onto the fleece fabric after the step of embossing.

FIG. 7 is a diagrammatic view in the manufacturing of the floor covering in accordance with a third embodiment where a layer of pressure sensitive adhesive is sprayed onto the fleece fabric before the step of embossing.

FIG. 8 is a diagrammatic view in the manufacturing of the floor covering in accordance with a fourth embodiment where the pressure sensitive adhesive is sprayed onto the fleece fabric and additionally, a layer of permanent adhesive is sprayed onto the nonwoven fleece fabric for engagement with the secondary backing before the step of embossing.

DETAILED DESCRIPTION OF THE PREFERRED EMBODIMENT

Referring now specifically to the drawings and more particularly to FIG. 1, a reference numeral 10 designates the preferred embodiment of the floor covering subsequent to it manufacturing wherein the floor covering is convolutely wound into a roll form 11. Although the illustrated embodiment shows the floor covering 10 convolutely wound into roll form 11 where pile yarns 12 face outwardly therefrom so that potential customers can see or feel the pile, alternatively, the floor covering which is in the form of carpet can be wound so that pile yarns face inwardly therefrom. As best seen in FIGS. 2 and 4, the floor covering is formed of pile yarns 12, defining a fibrous face, which are secured to a primary backing 13.

A secondary backing 14 conventionally is formed onto the primary backing 13 and permanently adhered thereto as will be explained in detail later. A nonwoven fleece fabric 15 is embossed into the secondary backing 14 to form respective high and low areas 20, 21. As will be explained later in detail, the low areas 21 extend into the secondary backing 14 and serve to unitize the fleece fabric 15 with the secondary backing 14. A layer of pressure sensitive adhesive 22 is on the exposed outer face of the fleece fabric 15 for releasably securing the floor covering 10 to an underlying floor. The low areas 21 in the embossed fleece fabric serve for reducing the exposed surface area of the layer of adhesive 22 that is available to contact an underlying floor when laying of the carpet thereon.

Referring now more particularly to FIG. 3, a desired method in manufacturing the floor covering 10 in accordance with the preferred embodiment of the present invention is shown. As illustrated, the floor covering 10 arrives from initial processing (not shown) where the pile yarns 12 are tufted or otherwise secured to the primary backing 13. A conventional bonding agent 25 such as latex, is applied to the back of the pile yarns 12 to lock the yarns in place to the primary backing 13. The primary backing 13 may be produced from a woven jute or polypropylene base. As is conventional, the primary backing 13 having pile yarns 12 secured thereto is convolutely wound into roll form 26 for further processing. During processing, the roll 26 is unwound and an uncured backing composition, which forms the secondary backing 14 upon curing, is applied to the primary backing 13 by means conventional in the carpet manufacturing industry. Typically, the backing composition 14 is selected from a variety of chemical compositions conventionally found in the carpet manufacturing industry. These can include a urethane as well as a plastisol composition containing polymers or copolymers of a vinyl compound. As will be explained in detail later, if a plastisol composition containing polymers or copolymers of a vinyl compound is used as a secondary backing 14, a special oleophobic pressure sensitive adhesive is desired because that type of adhesive is not adversely affected by the plasticizer immigration inherent in a vinyl plastisol secondary backing.

As illustrated, in accordance with this one desired method of manufacturing the floor covering, after the uncured backing composition is applied, the floor covering traverses under doctor blade 27 conventional to the industry which regulates the amount of backing composition applied to the primary backing 13 to form the secondary backing 14. When the amount of backing composition 14 has been regulated to its desired thickness by means of the doctor blade 27, the backing composition is either oven or air cured depending upon the chemical composition of the backing composition. Urethane or other similar backing compositions can be air cured. Plastisol compositions such as those which contain polymers or copolymers of vinyl compounds are oven cured. As illustrated schematically in FIG. 3, the processing line alternatively includes an oven 30 through which the floor covering 10 passes during processing to cure plastisol backing compositions or the like which typically are not air cured to form the secondary backing 14. Alternatively, a preformed secondary backing 14 (not shown) can be applied to the primary backing 13 and permanently adhered thereon by a suitable adhesive.

When the backing composition is cured to form the completed secondary backing 14, the nonwoven fleece fabric 15 is positioned in overlying relation to the secondary backing 14. The fleece fabric 15 is applied onto the secondary backing from a convolutely wound, feed roll 31 of fleece fabric which is guided and fed under tension into engagement with the secondary backing by a corresponding guide roll 32 and engagement roll 33. The nonwoven fleece fabric 15 is of well known construction and is produced from needle punched or spun bonded fibers. The amount of fleece fabric 15 applied to the secondary backing 14 depends on the thickness of the backing as well as the backing composition. Typically the weights and thicknesses commonly applied in the carpet manufacturing industry are used. For example, an approximate 1/16 inch thickness fleece fabric 15 can be applied onto a ⅛ inch thickness urethane secondary backing 14 and serve as an adequate reinforcement to the backing.

After the nonwoven fleece fabric 15 is positioned into engagement with the cured secondary backing 14, the fleece fabric is embossed by means of a conventional embossing roll 35 (FIG. 4). Typically, the embossing roll 35 is heated and supplies sufficient pressure in conjunction with a pressure roll 36 to form high and low areas 20, 21 in the fleece fabric 15. The heat and pressure are sufficient so that the low areas 21 extend into the secondary backing 14 to aid in unitizing the fleece fabric 15 with the secondary backing 14. The low areas 21 also effect securement of the fleece fabric 15 to the secondary backing 14. Typically, the embossing roll 35 will have a predetermined pattern, although a pattern is not necessary. In the illustrated embodiment, a diamond pattern is shown (FIG. 2). The type of pattern used on the embossing roll 35 can vary depending on the embossed pattern desired on the fleece fabric. The number of high areas 20 on the embossed fleeced fabric 15 can be varied to control the amount of adhesive 22 which will later contact an underlying floor by the choice of pattern on the embossing roll. Because the amount of adhesive 22 which contacts an underlying floor is regulated by the low areas 21 which do not contact the floor, the choice of an embossed pattern can determine how much adhesive 22 contacts the floor. Additionally, the heat and pressure applied by the embossing roll 35 onto the fleece fabric 15 can be varied so that the total area and depth of the low areas 21 formed on the embossed fleece fabric 15 can vary. Thus, the amount of adhesive 22 which contacts an underlying floor also is varied because only the high areas 20 as well as some intermediate points will contact the floor.

After embossing, a pressure sensitive adhesive 22 is applied to the exposed outer face of the fleece fabric. The adhesive 22 can be applied in numerous ways, which include rolling, and as illustrated, conventional spray application means 40 for spraying the adhesive 22 onto the fleece fabric 15. If spray application means 40 is desired, a catch basin 41 for receiving excess sprayed adhesive also is used. Because the carpet being formed is inverted during the processing thereof, it will be noted that the exposed lower outer face of the fleece fabric 15 faces upwardly in the drawings. The pressure sensitive adhesive 22 is provided for releasably securing the carpet to an underlying floor when the carpet is laid thereon. As illustrated, the low areas 21 in the embossed fleece fabric also are coated with the pressure sensitive adhesive. However, because the fleece fabric 15 is embossed, the low areas 21 in the embossed fleece fabric serve for reducing the exposed surface area of the layer of adhesive that is available to contact an underlying floor when laying the carpet thereon. Thus, the carpet 11 later can be removed from an underlying floor without ripping or tearing of the secondary backing 14 or separation of the fleece fabric 15 from the secondary backing. As is conventional, the pressure sensitive adhesive is cured in a curing oven 45 such as conventionally found in the carpet manufacturing industry.

The type of pressure sensitive adhesive applied also can vary. If a urethane secondary backing is desired, a wide variety of pressure sensitive adhesives 22 can be used because there is no migration of plasticizer or other harmful substances which adversely affect the quality of adhesive. If a plastisol backing composition such as those which contain polymers or copolymers of vinyl compounds is desired, an oleophobic pressure sensitive adhesive is desirable. The term oleophobic as used herein means a pressure sensitive adhesive which is not adversely affected by the plasticizer migration inherent in the vinyl plastisol secondary backing and which also has high shear strength for preventing slippage between the floor covering and an underlying floor and which has low tensile strength to facilitate removal and replacement of the floor covering 10 by permitting peeling of the floor covering from the floor.

Preferably, the oleophobic pressure sensitive adhesive used with the aforementioned plastisol secondary backings comprises a polymer or copolymer of at least one ethylenically unsaturated monomer. Particularly suitable are pressure sensitive adhesives derived from acrylic monomers. Exemplary acrylic monomers include aklyl esters of acrylic acid with an alkyl group having from 1 to 18 carbon atoms, including methyl, ethyl, n-butyl, sec-butyl, the various isomeric pentyl, hexyl, heptyl, and octyl (especially 2-ethylhexyl), lauryl, cetyl, stearyl and like groups; and alkyl esters of methacrylic acid with an alkyl group having from 4 to 18 carbon atoms, including n-butyl, n-hexyl, 2-ethylhexyl, n-octyl, lauryl, cetyl, stearyl and like groups. These monomers are selected to provide the high shear strength and low tensile strength needed to one skilled in the art. One particularly suitable oleophobic pressure sensitive adhesive which from testing is deemed to be commercially acceptable is an 80/20 copolymer of butyl acrylate/2-ethyl hexyl acrylate.

After curing of the pressure sensitive adhesive 22, a release cover 50 is applied (FIGS. 1 and 3) and the floor covering 10 subsequently is wound into a convolute roll 11. The release cover 50 is releasably secured to the layer of pressure sensitive adhesive 22 applied on the fleece fabric 15 so as to protect and maintain the tackiness of the adhesive layer 22 before laying the floor covering 10 onto the underlying floor. The release cover 50 is fed from a continuous feed roll 51 along a guide roll 52 and engagement roll 53 onto the floor covering. The release cover 50 contacts the exposed surface of the fleece fabric having the pressure sensitive adhesive retained thereon and adheres to the adhesive.

To minimize wrinkling of the release cover 50 during convolute winding, and to minimize wrinkling thereafter, the release cover preferably is formed of a flexible plastic material such as linear low density polyethylene having inherent stretchability. A positive 10% stretch during application of the release cover 50 onto the secondary backing 14 has been found sufficient to minimize wrinkling thereof. Preferably, the release cover 50 and the pressure sensitive adhesive 22 are transparent so as to allow arrows 60 embossed onto the fleece fabric following application of the fleece fabric onto the secondary backing and before application of the release cover, to be readily visible therethrough (FIG. 1). The arrows 60 are embossed thereon to correspond to a predetermined direction in which the pile yarns 12 of the carpet face so as to facilitate orientation of various sections of the floor covering in a common direction during installation. The lie of the pile yarns 12 of all sections readily may be oriented in a common direction by insuring that the arrows are aligned in one direction.

As shown in FIG. 1, the release cover 50 may include thereon at least one longitudinal tear line 61 for facilitating removal of the release cover in sections. Such a tear line 61 may be formed from a plurality of perforations 62. Of course, in some cases it may not be desirable to form a line of perforations 62 in the release cover but merely to cut away sections of the release cover. The tear line 61 is formed by conventional means prior to the application of the release cover 50 onto the secondary backing 14 and facilitates installation of the floor covering as will be described later. Although the illustrated embodiment shows a single tear line 61 located in the medial portion of the release cover thereof, two or more spaced apart longitudinal tear lines may be incorporated into the release cover.

The floor covering 10 preferably is supplied in 6-foot widths which facilitates installation. During installation, the floor covering is unrolled, cut-to-length, and laid onto the floor. Although the installation steps are not illustrated, they will be described by reference to existing elements shown in the drawings, and in accordance with one method of installation. The floor covering 10 initially is folded upon itself so that the pile yarns 12 oppose one another. The release cover 50 on the uppermost folded-over length then is removed by rupturing the release cover 50 along the tear line 61 to expose the layer of pressure sensitive adhesive 22. The folded-over length is positioned against the floor and the remainder portion folded over. The rest of the release cover 50 is removed from the remainder portion positioned against the floor. The present invention also facilitates accurate and easy shifting of the floor covering when it is initially installed on the underlying floor. Only the high areas 20 of the embossed fleece fabric contact the underlying floor, thus reducing the surface area of contact of the pressure sensitive adhesive 22 for an underlying floor. The reduced surface area of contact between the pressure sensitive adhesive and underlying floor facilitates accurate and easy shifting of the floor covering when it is initially installed on the floor.

If access to various telephone or electrical conduit lines extending through an underlying floor is required, the adhesively secured floor covering can be removed by peeling the carpet upwardly from the underlying floor. A release cover then can be reapplied to the exposed layer of pressure sensitive adhesive to protect the layer of adhesive and facilitate handling of the removed floor covering until reinstalled. Alternatively, the roll can be cut into preselected square configurations, i.e. 18 inch dimensioned carpet squares. Individual carpet squares then can be installed. However, installation of carpet squares is more time consuming and currently is not the desired method of installation among those skilled in the art.

Referring now to FIGS. 5-8, various embodiments of the present invention are illustrated. In FIG. 5, the aforementioned preferred embodiment having the pressure sensitive adhesive 22 applied to the nonwoven fleece fabric 15 after embossing is shown in abstract form.

In FIG. 6, a second embodiment of the present invention is illustrated. A permanent adhesive 70 is applied to the face of a nonwoven fleece fabric. The adhesive is applied by either rolling or other conventional application techniques, such as the illustrated conventional spray application means 71. A catch basin 72 conventional to the art is incorporated therewith so as to catch any excess permanent adhesive 70 which is not sprayed onto the fleece fabric. The fleece fabric is applied onto the secondary backing so that the permanent adhesive engages the secondary backing. The fleece fabric 15 is embossed to form high and low areas 20, 21 with the low areas 21 extending into the secondary backing 14 and serving to unitize the fleece fabric with the secondary backing as in the prior embodiment. The permanent adhesive 70 aids in assuring securement of the fleece fabric to the secondary backing. This may be necessary when a strong pressure sensitive adhesive 22 is used or the carpet is placed on a very smooth underlying floor which imparts greater adhesive tenacity which may cause the fleece fabric to separate from the secondary backing when the carpet is removed from an underlying floor.

The type of permanent adhesive 70 applied onto the fleece fabric 15 for engagement with the secondary backing 14 also can vary. A variety of permanent bonding adhesives can be used which include thermoplastic adhesives and other adhesives with a green tack which effect curing after a period of time, such as 24 hours to form a permanent bond. Additionally, a pressure sensitive adhesive having appropriate additives can be used as a permanent adhesive to form a permanent bond thereat. For example, if an oleophobic pressure sensitive adhesive is used, such as with a vinyl plastisol secondary backing, urea-formaldehyde or melamine-formaldehyde can be added to the adhesive to create internal cross linking to create a more permanent bond. Additionally, bi-functional and tri-functional acrylates which initiate entanglement of polymer chains can be added to increase internal cross linking in the pressure sensitive adhesive and provide a more permanent bond, as opposed to a pressure sensitive bond. Other colloids and additives can be imparted to a pressure sensitive adhesive to initiate internal cross linking and other chemical changes and initiate a permanent bond. The use of the same pressure sensitive adhesive can be economical because only one storage means (not shown) can be utilized, and any additives needed can be added to the spray application means to create an adhesive which bonds permanently.

Referring now to FIG. 7, a third embodiment is illustrated where the pressure sensitive adhesive 22 is applied to the fleece fabric 15 before embossing. Again spray application means and a catch basin 40, 41 conventional to the industry are used. It may be desirable to apply an adhesive before embossing to reduce one manufacturing step in the overall line of operation. However, the application of the pressure sensitive adhesive 22 to the fleece fabric 15 before embossing is not as preferred, because the embossing roll 35 engages the uncured pressure sensitive adhesive and the embossing quality can be reduced thereby.

FIG. 8 shows a fourth embodiment where the pressure sensitive adhesive 22 is applied to the fleece fabric 15 before embossing and a permanent adhesive 70 is applied to the face of the fleece fabric which will engage the secondary backing. The embossing roll 35 engages the pressure sensitive adhesive 22, and thus this method of manufacture is not as desirable.

In the drawings and specification there has been set forth preferred embodiments of this invention. In summary, there is disclosed a carpet with a secondary backing. A fleece fabric is positioned against the secondary backing and is embossed to form high and low areas with the low areas extending into the secondary backing. The embossed low areas serve to unitize the fleece fabric to the secondary backing. A layer of pressure sensitive adhesive is on the exposed outer face of the fleece fabric for releasably securing the carpet to an underlying floor. The low areas of the embossed fleece fabric serve for reducing the exposed surface area of the layer of adhesive that is available to contact the underlying floor.

Although specific terms are employed, they are used in a generic and descriptive sense only and not for the purposes of limitation, the scope of the invention being defined in the following claims:

That which is claimed is:

1. A floor covering comprising a carpet having textile fibers defining a fibrous upper outer face and a primary backing to which the textile fibers are secured, a secondary backing permanently adhered to the lower surface of said primary backing, a nonwoven fleece fabric positioned against said secondary backing and being embossed so as to form high and low areas with the low areas extending into said secondary backing and serving to unitize the fleece fabric with the secondary backing, a layer of pressure sensitive adhesive on the exposed outer face of said fleece fabric for releasably securing the floor covering to an underlying floor, and a release cover releasably secured to said layer of pressure sensitive adhesive to protect and maintain the tackiness of the adhesive layer before laying of the floor covering on an underlying floor, and with the low areas in the embossed fleece fabric serving for reducing the effective exposed surface area of the layer of adhesive that is available to contact the underlying floor when laying of the floor covering thereon.

2. A floor covering according to claim 1 wherein said secondary backing is formed of a flexible polymeric material.

3. A floor covering according to claim 1 wherein said release cover is formed of a linear low density polyethylene.

4. A floor covering according to claim 1 wherein said pressure sensitive adhesive is an oleophobic adhesive comprising a polymer or copolymer of at least one ethylenically unsaturated monomer.

5. A floor covering according to claim 1 wherein said secondary backing is formed from a plastisol composition containing polymers or copolymers of vinyl compounds.

6. A floor covering according to claim 1 wherein said secondary backing is formed from a urethane composition.

7. The floor covering as claimed in claim 1 wherein said textile fibers forming said fibrous face are pile yarns, and wherein arrows are embossed on said fleece fabric corresponding to a predetermined direction of the lie of the pile yarns of the carpet.

8. The floor covering as claimed in claim 1 wherein said carpet is in the form of a carpet square.

9. A floor covering comprising a carpet having textile fibers defining a fibrous upper outer face and a primary backing to which the textile fibers are secured, a secondary backing permanently adhered to the lower surface of said primary backing, a nonwoven fleece fabric positioned against said secondary backing and being embossed so as to form high and low areas with the low areas extending into said secondary backing and serving to unitize the fleece fabric with the secondary backing, a layer of permanent adhesive between said secondary backing and said fleece fabric to aid in securing said fleece fabric to said secondary backing, a layer of pressure sensitive adhesive on the exposed outer face of said fleece fabric for releasably securing the floor covering to an underlying floor, and with the low areas in the embossed fleece fabric serving for reducing the effective exposed surface area of the layer of adhesive that is available to contact the underlying floor when laying of the floor covering thereon.

10. A method of making a floor covering such as a carpet with pressure sensitive adhesive thereon for facilitating installation and wherein the carpet has textile fibers defining a fibrous upper outer face, a primary backing to which the textile fibers are secured, and a secondary backing permanently adhered to said primary backing, said method comprising positioning a nonwoven fleece fabric in overlying relation with the secondary backing, then embossing the nonwoven fleece fabric while supplying sufficient heat and pressure to form high and low areas with the low areas extending into the secondary backing to effect securement of the fleece fabric to the secondary backing, applying a layer of pressure sensitive adhesive to the outer face of the fleece fabric for releasably securing the floor covering to an underlying floor when laying of the floor covering on the underlying floor, and with the low areas in the embossed fleece fabric serving to reduce the effective exposed surface area of the layer of adhesive that is available to contact an underlying floor when laying of the floor covering thereon.

11. A method according to claim 10 wherein the layer of pressure sensitive adhesive is applied by spraying the adhesive onto the fleece fabric after the step of embossing.

12. A method according to claim 10 wherein the layer of pressure sensitive adhesive is applied by spraying the adhesive onto the fleece fabric before the step of embossing.

13. A method according to claim 10 which includes applying a release cover in releasable engagement with the layer of adhesive on the fleece fabric to protect and maintain the tackiness of the adhesive layer before laying of the floor covering on an underlying floor.

14. A method according to claim 10 which includes winding the carpet into a convolute roll for facilitating handling and shipment.

15. A method of making a floor covering such as a carpet with pressure sensitive adhesive thereon for facilitating installation and wherein the carpet has textile fibers defining a fibrous face, a primary backing to which the textile fibers are secured and a secondary backing permanently adhered to the primary backing, said method comprising applying a layer of permanent adhesive to one face of a nonwoven fleece fabric, positioning the secondary backing into engagement with the layer of permanent adhesive on the fleece fabric, embossing the nonwoven fleece fabric while supplying sufficient heat and pressure to form high and low areas with the low areas extending into the secondary backing to effect securement of the fleece fabric to the secondary backing, applying a layer of pressure sensitive adhesive to the fleece fabric for releasably securing the floor covering to an underlying floor and with the low areas in the embossed fleece fabric serving to reduce the effective exposed surface area of the adhesive that is available to contact the underlying floor when laying of the floor covering thereon.

16. A method according to claim 15 wherein the layer of pressure sensitive adhesive is applied by spraying the adhesive onto the fleece fabric after the step of embossing.

17. A method according to claim 15 wherein the layer of pressure sensitive adhesive is applied by spraying the adhesive onto said fleece fabric before the step of embossing.

18. A method according to claim 15 which includes applying a release cover in releasable engagement with the layer of adhesive on the fleece fabric to protect and maintain the tackiness of the adhesive layer before laying of the floor covering on a underlying floor.

19. A method according to claim 15 including winding the carpet into a convolute roll for facilitating handling and shipment.

* * * * *